US 8,369,514 B2

(12) United States Patent
Braun et al.

(10) Patent No.: US 8,369,514 B2
(45) Date of Patent: Feb. 5, 2013

(54) METHOD FOR THE SECURE DETERMINATION OF DATA

(75) Inventors: Michael Braun, München (DE); Anton Kargl, München (DE); Bernd Meyer, München (DE); Stefan Pyka, Markt Schwaben (DE)

(73) Assignee: Seimens Aktiengesellschaft, Munich (DE)

( * ) Notice: Subject to any disclaimer, the term of this patent is extended or adjusted under 35 U.S.C. 154(b) by 848 days.

(21) Appl. No.: 12/294,806

(22) PCT Filed: Dec. 19, 2006

(86) PCT No.: PCT/EP2006/069917
§ 371 (c)(1),
(2), (4) Date: Sep. 26, 2008

(87) PCT Pub. No.: WO2007/112791
PCT Pub. Date: Oct. 11, 2007

(65) Prior Publication Data
US 2010/0172490 A1    Jul. 8, 2010

(30) Foreign Application Priority Data

Mar. 28, 2006 (DE) .......................... 10 2006 014 353

(51) Int. Cl.
*H04L 9/00* (2006.01)
(52) U.S. Cl. .............. 380/28; 380/29; 380/30; 380/286; 713/169; 713/172; 709/220
(58) Field of Classification Search .................... 308/28, 308/30, 286; 380/28, 29, 30, 286; 173/155, 173/169, 172; 709/220
See application file for complete search history.

(56) References Cited

U.S. PATENT DOCUMENTS

| | | | | |
|---|---|---|---|---|
| 6,466,668 | B1 * | 10/2002 | Miyazaki et al. | 380/30 |
| 7,536,011 | B2 * | 5/2009 | Takenaka et al. | 380/28 |
| 7,639,808 | B2 | 12/2009 | Izu et al. | |
| 7,864,951 | B2 * | 1/2011 | Al-Gahtani et al. | 380/28 |
| 7,961,872 | B2 * | 6/2011 | Bolotov et al. | 380/28 |

(Continued)

FOREIGN PATENT DOCUMENTS

| | | |
|---|---|---|
| DE | 101 56 708 | 6/2003 |
| DE | 102 02 700 | 8/2003 |

(Continued)

OTHER PUBLICATIONS

Joye et al. "The Montgomery Powering Ladder," Cryptographic Hardware and Embedded Systems, International Workshop, pp. 291-302, Aug. 13, 2002.

(Continued)

*Primary Examiner* — Thu Ha Nguyen
(74) *Attorney, Agent, or Firm* — Staas & Halsey LLP

(57) ABSTRACT

The aim of the embodiments is to provide a method for the secure processing of data, in which security is increased in relation to side channel attacks. To achieve this, operation codes for commanding co-processors are determined, for example for the bit-dependent transposition of register contents. The solution exploits the fact that as a result of the technical configuration for the co-processor, a shift of register contents, for example from register A to register B cannot be differentiated from the exterior from a shift from register A to register C.

11 Claims, 2 Drawing Sheets

U.S. PATENT DOCUMENTS

| | | |
|---|---|---|
| 2002/0029346 A1 | 3/2002 | Pezeshki et al. |
| 2004/0039928 A1 | 2/2004 | Elbe et al. |
| 2005/0055563 A1 | 3/2005 | Fischer et al. |
| 2005/0152541 A1* | 7/2005 | Takenaka et al. ............... 380/28 |
| 2006/0093137 A1 | 5/2006 | Izu et al. |
| 2006/0153372 A1* | 7/2006 | Kim et al. ........................ 380/30 |
| 2007/0189543 A1* | 8/2007 | Gammel et al. ............. 380/286 |
| 2008/0019509 A1* | 1/2008 | Al-Gahtani et al. ............ 380/30 |
| 2008/0222417 A1* | 9/2008 | Downes et al. ............... 713/172 |
| 2009/0292921 A1* | 11/2009 | Braun et al. .................. 713/169 |
| 2011/0075836 A1* | 3/2011 | Yamamoto et al. ............ 380/28 |
| 2012/0079080 A1* | 3/2012 | Pishevar ....................... 709/220 |
| 2012/0131331 A1* | 5/2012 | Benson ......................... 713/155 |

FOREIGN PATENT DOCUMENTS

| | | |
|---|---|---|
| EP | 1 320 027 | 12/2002 |
| JP | 2002-535705 | 10/2002 |
| JP | 2004-516706 | 6/2004 |
| JP | 2006-78943 | 3/2006 |
| WO | 2004-/055756 A1 | 7/2004 |
| WO | 2005/015526 A1 | 2/2005 |

OTHER PUBLICATIONS

Izu et al. "Improved Elliptic Curve Multiplication Methods Resistant Against Side Channel Attacks," Progress in Cryptology-Indocrypt, International Conference in Cryptology in India, pp. 296-313, Dec. 16, 2002.

Japanese Office Action (submitted in German) issued Sep. 6, 2011 in corresponding Japanese Patent Application 2009-501867.

* cited by examiner

METHOD FOR THE SECURE DETERMINATION OF DATA

CROSS REFERENCE TO RELATED APPLICATIONS

This application is based on and hereby claims priority to International Application No. PCT/EP2006/069917, filed Dec. 19, 2006, and German Application No. 10 2006 014 353.1, filed Mar. 28, 2006, the contents of which are hereby incorporated by reference.

BACKGROUND

The embodiments discussed herein relate to a method for the secure determination of data in which in a first processor a mathematical operation with a key is applied to a point of an elliptical curve, wherein the key may be depicted as a binary number with a sequence of bits ($b_i$).

By means of the establishment of key pairs consisting of a private and a public key, asymmetrical cryptography systems guarantee a high enough degree of security to ensure that it is virtually impossible for an attacker to decode the private key or the message encoded with the public key in finite time. Conventional cryptography systems, such as, for example, those based on elliptical curves, are based on encoding which can be performed in polynomial time but can be only inverted in exponential time relative to the length of the key in bits. With systems based on elliptical curves, nowadays, key lengths of n=160 to 192 bits are used and with systems based on RSA algorithms lengths of n=1024 to 1536 bits should be used for approximately the same security level.

Therefore, cryptographic methods based on elliptical curves are more efficient and require less bandwidth to transmit the system parameters than other cryptographic methods with a comparable degree of achievable security.

As an example, there now follows an outline of the known Diffie-Hellman method for agreeing a key between two communication subscribers based on elliptical curves. Hereby, the first communication subscriber A knows a security parameter $r_a$ and the second communication subscriber B knows a security parameter $r_b$. When the two communication subscribers have agreed on an elliptical curve and on a common point P on this elliptical curve, the communication subscriber A determines a value $$Q_a = r_a * P$$

and the communication subscriber B a value $$Q_b = r_b * P.$$

Subsequently, the value $Q_a$ is transmitted by the communication subscriber A to the communication subscriber B and the value $Q_b$ by the communication subscriber B to the communication subscriber A. In a further scalar multiplication, the communication subscriber A now determines the common key $$K = r_a * Q_b = r_a * r_b * P$$

and the communication subscriber B the same common key $$K = r_b * Q_a = r_b * r_a * P.$$

Therefore, these scalar multiplications form an essential building block in cryptographic methods based on elliptical curves. It is particularly advantageous to use elliptical curves, since the inversion operation, that is the determination of a scalar $r_{a,b}$ from the knowledge of the points $Q_{a,b}$ and P, so that $Q_{a,b} = r_{a,b} * P$, can only be calculated with a significant calculating effort. With the present level of knowledge, the scalar multiplication can be calculated in polynomial time but inverted only in exponential time.

However, the known cryptographic methods based on elliptical curves are vulnerable with respect to so-called side channel attacks. These represent an alternative to methods of attack based on the inversion of the encoding in order to break the algorithm on which the encoding is based in the most efficient way possible. These are used in particular with mobile aids such as, for example, smartcards or dongles on which secret key material is stored in order to generate an encoded exchange of messages or decode messages once again.

The attacker uses the comparatively easy accessibility of data lines of the corresponding circuits in order to measure physical variables such as power, electromagnetic emission, results with induced errors or run times of certain calculations. A direct evaluation of the measured values on the basis of a simple power analysis (SPA) or by recording measured values such as power by means of a storage oscilloscope and subsequent statistical evaluation is an efficient way of obtaining information on the underlying algorithm or, in the worst case, information on a currently existing key.

The latter will be explained in more detail with reference to an example: a method for encoding provides a mathematical operation for both algorithms based on elliptical curves and for algorithms based on the RSA method.

In the case of elliptical curves, a scalar multiplication $$Q = k * P$$

should be performed as a mathematical operation, wherein P is a point on an elliptical curve over a finite field K and k is again a key or a variable derived therefrom.

A possible implementation of the scalar multiplication can be achieved by implementing the following algorithm on an arithmetic and logic unit, wherein the key k is set by a binary representation ($b_i$ i=n−1−0):

Algorithm 1:EC—elliptical curve: Q =k*P
(1.1) Q←0
(1.2) i←n−1
(1.3) while i>−1
(1.3.1) Q←2*Q
(1.3.2) if $b_i$=1, then Q←Q+P
(1.3.3) i←i−1
(1.4) deliver Q In the case of a simple power analysis (SPA), the profile of the power consumption of a scalar multiplication is analyzed. The scalar multiplication primarily consists of additions and duplications. However, the operations differ significantly in the number of elementary operations in K, so that the power consumption also differs. Therefore, it is possible to use a corresponding side channel attack to draw conclusions regarding the individual bits and hence the binary representation of k itself.

One possible step for defense against attacks of this kind consists in aligning the power flows and calculation run times dependent upon the value of a respective bit for both possible bit states 0 and 1 as demonstrated in the following:

A point P of an elliptical curve E is defined by its x-coordinate and its y-coordinate. On the basis of the curve equation of the elliptical curve E, there are at the most two different y-values y1 and $y_2$ for one x-value so that the points (x,y1) and (x,$y_2$) are points on the elliptical curve E. In order, therefore, unequivocally to define a point on the elliptical curve E, apart from the x-coordinate, only one bit of additional information is required.

In the case of an elliptical curve E over finite prime fields, for example, the so-called least significant bit (LSB) of the y-coordinate or the (+/−) sign of the y-coordinate of the respective point is sufficient as additional information These properties of elliptical curves are used in the so-called Montgomery ladder algorithm, which is a common method for the implementation of scalar multiplication on elliptical curves. The Montgomery ladder algorithm can be implemented in such a way that only the x-coordinate of P is used to calculate the x-coordinate of a scalar multiple of a point P. Since, as demonstrated below, the Montgomery ladder is simultaneously a very good method for counteracting simple power analyses, it is frequently implemented in crypto systems running on embedded systems.

According to the method of a Montgomery ladder algorithm described below, a multiple k*P of a point P located on an elliptical curve is calculated.

The scalar $k=(b_{n\_l}, \ldots, b_i, \ldots, b_0)$, specified in binary representation, is processed bit-by-bit starting with the so-called most significant bit (MSB, N1).

Algorithm 2: EC—elliptical curve: Q=k*P Montgomery ladder:

(2.1) R←P, S←0
(2.2) i←n−1
(2.3) while i>−1
(2.3.1) if bi=1 {S←S+R, R←2*R}
(2.3.2) else {R←R+S, S←2*S}
(2.3.3) i←i−1
(2.4) deliver R, S
(2.5) reconstruct k*P from the points R, S and P In the example shown, the addition and the duplication are executed bit-independently completely uniformly. It is therefore not possible to draw any conclusions regarding the bit sequence from the sequence of the operations. However, problems are presented by the jump instruction ("if" or "else"), since this leads to a jump to different addresses which becomes apparent from a different power consumption.

SUMMARY

Therefore, an aspect on which the invention is based is a method for the secure processing of data in which the security against side channel attacks is further increased.

According to the embodiments, this aspect is achieved by a method with the features discussed herein.

According to the embodiments, in a method for the secure determination of data in a first processor a mathematical operation with a key is applied to a point of an elliptical curve, where the key can be represented as a binary number with a sequence of bits (ID). The method includes a first instruction (x) which leads in a further second processor to a first operation (X) on the contents of at least one register and a second instruction (y) which leads in the further processor to a second operation (Y). At least one value (d) is determined in dependence on the two instructions (x, y). A first auxiliary variable (R) and a second auxiliary variable (S) are initialized, that is provided with start values. The following steps are performed in sequence for each bit ($b_j$) of the key:

The first auxiliary variable (R) is communicated to a first register of the further processor and the second auxiliary variable (S) is communicated to a second register of the further processor. In dependence on the value of the bit ($b_j$) and the at least one value (d), an instruction is assigned to an output variable (A) in such a way that either the first instruction (x) is assigned or the second instruction (y) is assigned. The output variable (A) is transmitted to instruction register of the further processor.

Finally, the first (R) and second (S) auxiliary variables updated in the further second processor are determined. After the termination of the steps for the bits (b), the first (R) and/or the second (S) auxiliary variable are output and a result of the mathematical operation from the first (R) and/or the second auxiliary variable (S) determined.

Without excluding the general meaning of the term, for the purposes of the embodiments a further process should be understood to mean a coprocessor, in particular a crypto-coprocessor. This has a restricted instruction set and is protected by hardware technology in such a way that it is virtually impossible to identify from measurements whether equivalent or non-equivalent operations are being performed in the coprocessor.

Therefore, the embodiments are in particular characterized by the fact that in the method instructions, so-called operational codes, are determined for the coprocessor, which effect a transposition or no transposition of register contents within the coprocessor. Due to the technical configuration of the coprocessor, the shift of register contents for example from register A to register B cannot be differentiated from the exterior from a shift from register A to register C. Consequently, the described generic approach for achieving the aspect includes in particular in that, instead of determining addresses for storage regions containing the auxiliary variables to be processed, operational codes for instructions for coprocessors for the bit-dependent transposition of register contents are determined. Hereby, use is made of the fact that addresses of register contents play no role in coprocessors since the auxiliary variables are already loaded in the register of the coprocessor and the registers are implicitly addressed by the respective operational code.

Insofar, the method according to the embodiments has the advantage that the protection from side channel attacks, in particular by a power analysis, is significantly increased since the transposition of two registers takes place exclusively inside the coprocessor and the transposition or the non-transposition is based on the transmission of two operational codes, the implementation of which inside the coprocessor cannot be differentiated.

A further important advantage of the embodiments is the fact that an if-else branch, which is particularly susceptible to side channel attacks, is avoided in that an implicit determination of the if-else branch is performed by the calculation of a difference between the two operational codes.

The use of the embodiments is not restricted to coprocessors. For example, it is possible to use the method according to the invention to select different operational codes for the implementation of a self-modifying program and in this way implement an implicit if-else branch. In addition, the method according to the invention can be transferred to other implementations of rapid exponentiation routines and scalar multiplications.

According to an advantageous embodiment, the first (x) and the second (y) instruction have the same Hamming weight. Therefore, it is ensured in an advantageous way that it also impossible to differentiate the two instructions (x, y) from the exterior by side channel attacks.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
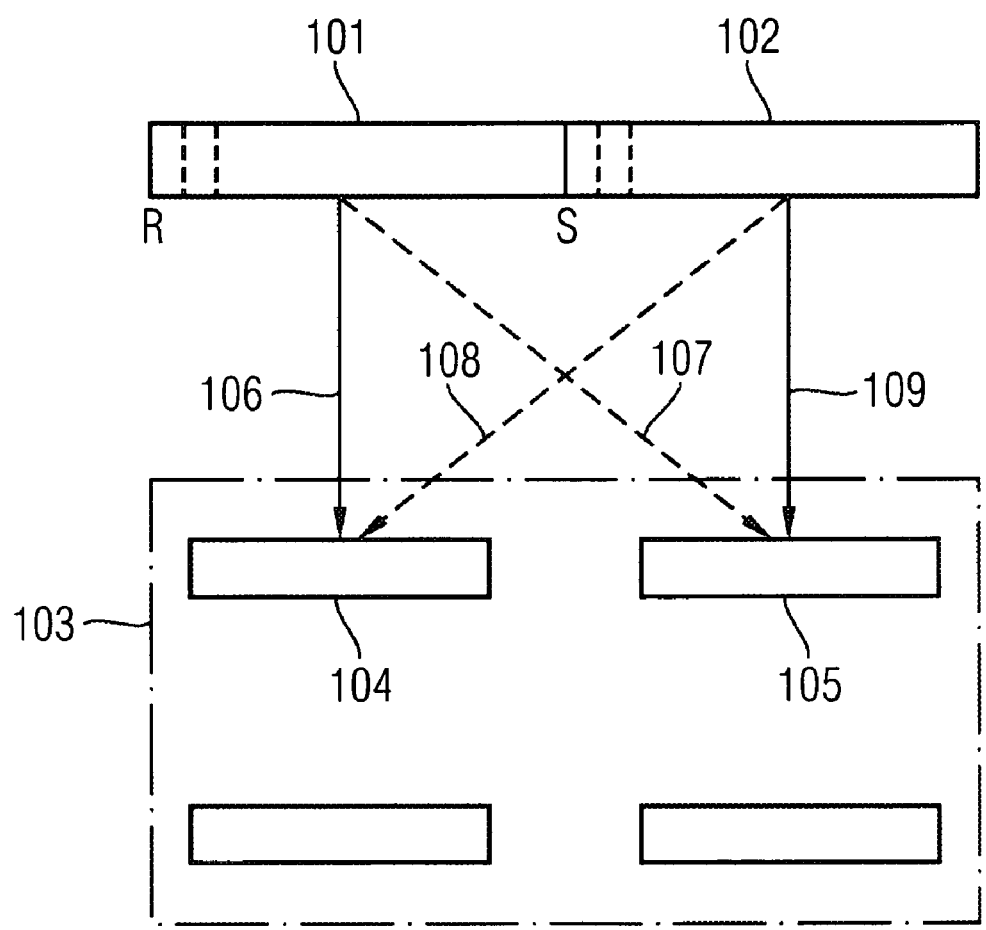
FIG. 1 a schematic representation of the assignment of auxiliary variables (R, S) to different registers of a coprocessor, FIG. 2 a schematic representation of the assignment of auxiliary variables (R, S) to registers of a coprocessor by operational codes within the coprocessor.

Reference will now be made in detail to the preferred embodiments, examples of which are illustrated in the accompanying drawings, wherein like reference numerals refer to like elements throughout.

From the sequence of a Montgomery ladder known from the prior art shown in algorithm 2, it is identifiable that depending on the bit ($b_i$), in the steps (2.3.1) and (2.3.2) (bi) only the auxiliary variables (R,S) are transposed.

(3.1) if bi=1: {S←S+R, R←2*R}
(3.2) else {R←R+S, S←2*S}

Therefore, algorithm 2 can be further simplified in that the auxiliary variables at the start and at the end of a executed loop are transposed if the key bit adopts the value 0. It is then only necessary to be referred to one of the two jump addresses, with F1={S←S+R, R←2*R}:

(4.1) if $b_i$=1: F1
(4.2) else {swap (R,S), F1, swap (R,S)}.

FIG. 1 shows a hardware implementation of the Montgomery ladder algorithm on which a method of this kind is based. Depending upon the value of a key bit ($b_i$), two auxiliary variables (R) 101 and (S) 102 are each shifted into a first 104 or second 105 register of a coprocessor 103. For example, if the key bit has the value 1, the auxiliary variable (R) 101 is shifted 106 into the first register 104 and the auxiliary variable (S) 102 is shifted 109 into the second register 105. If, on the other hand, the key bit adopts the value 0, the auxiliary variable (R) 101 is shifted 107 into the second register 105 and the auxiliary variable (S) 102 is shifted 108 into the first register 104.

In both cases, the function F1 is performed in the coprocessor 103 so that the results of the function F1 may have to be transposed once again.

However, the described method has the drawback that there is still a possibility of detection by side channel attacks since, depending upon the bit value, two memory accesses per computer word are required when copying. Longer field elements require numerous accesses which is reflected significantly in the power consumption.

According to the present invention, this drawback is rectified in that the transposition of the auxiliary variables (R,S) is performed within the coprocessor.

Figure 2:
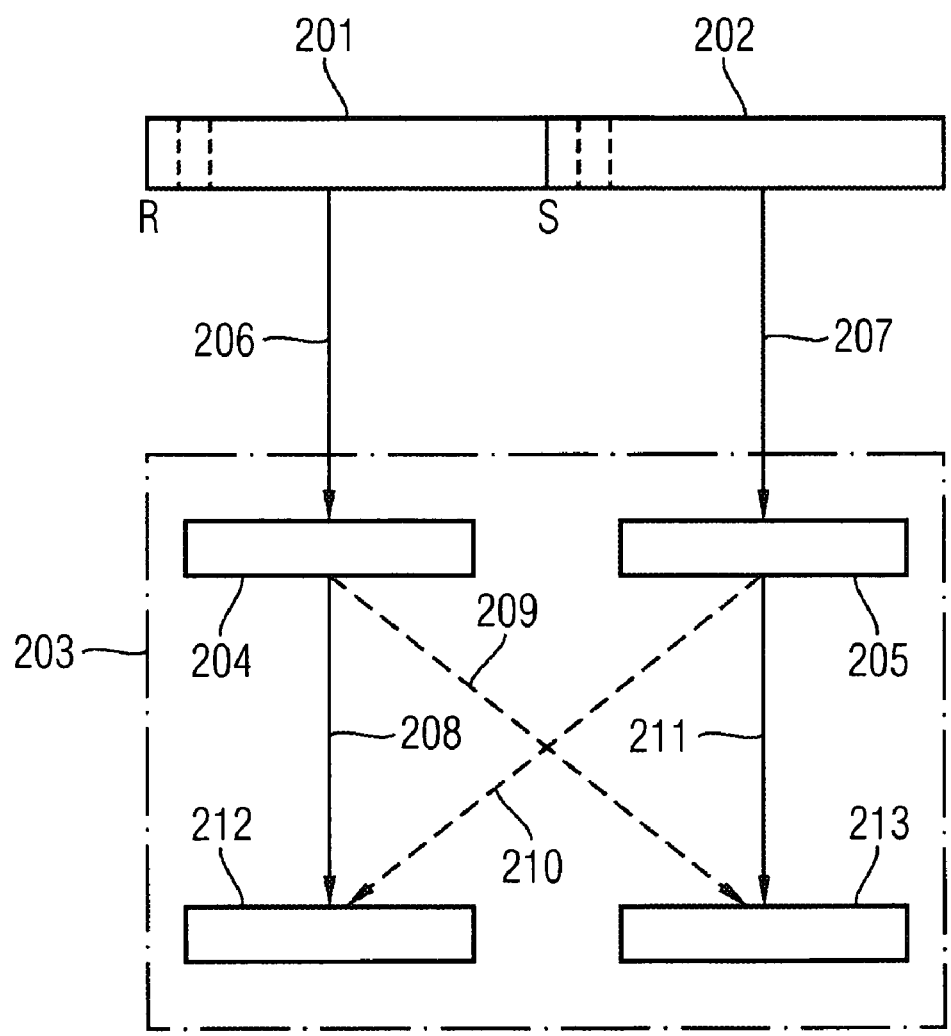

This process is shown in FIG. 2. Independently of the respective key bit ($b_i$), the auxiliary variable (R) 201 is shifted 206 into the first register 204 of the coprocessor 203 and the second auxiliary variable (S) 202 is shifted 207 into the second register 205 of the coprocessor 203. However, depending upon the respective key bit ($b_i$), an operation key for the coprocessor 203 is determined and shifted into the instruction register of the coprocessor. With a value of 1 for the key bit, a first operation key is shifted into the instruction register, so that the auxiliary variable (R) in the first register 204 is shifted 208 into the third register 212 and the auxiliary variable (S) in the second register 205 is shifted 211 into the fourth register 213. With a value of 0 for the key bit, on the other hand, a second operation key is shifted into the instruction register so that the auxiliary variable (R) in the first register 204 is shifted 209 into the fourth register 213 and the auxiliary variable (S) in the second register 205 is shifted 210 into the third register 212.

In a further example of an embodiment, R,S,C are internal data registers of the coprocessor. The above described instruction sequence for the coprocessor can be depicted as:

(5.1) if bi=0 then {transpose (R,S)}
(5.2) else {do not transpose (R,S)}.

With the aid of a third data register C, the instruction sequence can also be described as follows:

(6.1) if bi=0 then {C←R, R←S, S←C}
(6.2) else then {C←R, R←S, R←C}
or
(7.1) C←R, R←S
(7.2) if $b_i$=0 then {S←C}
(7.3) else then {R←C}.

The assignments S←C and R←C performed in step (7.1) do not result in any measurable difference in the power consumption, however, as before, the bit-dependent branching is not protected against side channel attacks. The following describes the instruction S←C by the operational code (x) and the instruction R←C by the operational code (y) and it is also assumed that the general principle x<y applies without restriction. An instruction with an operational code is executed by the coprocessor in that the corresponding operational code is written into the instruction register of the coprocessor. With these assumptions, the instruction sequence can be described as follows:

(8.1) if $b_i$=0 then {A←x}
(8.2) else then {A←y}
(8.3) C←R, R←S
(8.4) write the opcode from A into the instruction register.

The only remaining measurable bit dependence in the above-described algorithm is caused by the assignment of the operational codes. According to the invention, the avoidance of the jump instruction in (8.1) and (8.2) is achieved in that the difference d=y−x is formed between the instructions (x) and (y), so that the result of the jump instruction can be calculated as follows in a bit-dependent way:

$$A = x + d \cdot b_1$$

This method can be further improved by the addition of two computer words h and h', wherein the two computer words (h, h') only differ in the least significant bit of the computer word h, which is the respective key bit $b_i$. Therefore, the following is obtained with the subtraction h−h'=$b_i$ and the sought operational code can be calculated as follows:

$$A = x + h \cdot d − h' \cdot d$$

This polynomial is described in the following algorithm:

(9.1) Rotate $b_i$ to the LSB of the word h
(9.2) Copy h to h' and delete the LSB of h'
(9.3) A←x
(9.4) m←h*d
(9.5) A←A+m
(9.6) m←h'*d
(91) A←A−m If this result is applied to the Montgomery ladder algorithm described in algorithm 2, the following algorithm is obtained:

(10.1) x instruction{S←C}//Transpose register contents from R,S
(10.2) y instruction{R−C}//No transposition of R,S (10.3) R←P, S←0
(10.4) d←y−x with x<y
(10.5) for i←n−1 to 0 do
(10.6) Rotate $b_i$ to the LSB of the word h
(10.7) Copy h to h' and delete the LSB of h'
(10.8) A←x
(10.9) m←h*d
(10.10) A←A+m (10.11) m←h'*d
(10.12) A←A−m
(10.13) C←R, R←S
(10.14) Load A into instruction register of coprocessor
(10.15) Calculate in the coprocessor S←S+R, R←2*R
(10.16) C←R, R←S
(10.17) Load A into instruction register of coprocessor
(10.18) end
(10.19) reconstruct k*P from R, S and P In a further example of an embodiment, when using, for example, the coprocessor ACE, the implementation according to the invention is written on the chip SLE66CX320P made by Infineon.

The crypto-coprocessor ACE has four data registers CR0, CR1, CR2 and CR3 and an operand register C. In this example, two auxiliary variables are loaded into the data registers CR1 and CR2, the contents of which should now be transposed. The secret bit is the least significant Bit (LSB) of the working register A, which in this case has the length 8 bits.

The crypto-coprocessor ACE possesses inter alia the instructions move_CR1_C and move_CR2_c, which may be used to shift the contents of the register C into the register CR1 or into the register CR2. The operational code x for the first instruction is 0x6b and the operational code y for the second instruction is 0x73. Because the difference d between the operational codes is 8, the multiplication with h d in the above-described algorithm (9.4) can be replaced by a shift instruction and hence the algorithm simplified. The following algorithm now shows the determination of the desired operational codes for the first or second instruction, wherein the operation & represents the logic AND operation:

Selection of the opcodes
(11.1) Rotate A cyclically by three bits to the left
(11.2) Set B←A+0x6b
(11.3) Calculate A←A & 0xf7 (mask out the third lowest bit)
(11.4) Set A 1←B←A In step (11.1), the key and hence the bit to be used for differentiation is rotated cyclically 3 bits to the left by a shift instruction corresponding to a multiplication with the difference 8. In step (11.2), the value of the opcode x is added. In step (11.3), the bit to be used for differentiation is deleted and the remaining portion then subtracted again in the fourth step (11.4).

The following implementation is an alternative solution, wherein the operation represents the logic OR operation:

Selection of the opcodes
(12.1) Calculate A & 0xfd (mask out the second least significant bit)
(12.2) Set A←A+1
(12.3) Calculate A & 0x03 (mask out all bits apart from the two least significant)
(12.4) Rotate A three bits to the left
(12.5) Calculate A | 10x63

The effect of the instructions in the steps (12.1) to (12.3) is that, in dependence on the least significant bit of the key to be used for the differentiation, the value 1 is assigned to the register A if the bit has the value 0 or the value 2 is assigned to the register A if the bit has the value 1. In step (12.4), the contents of the register A are rotated 3 bits to the left corresponding to a multiplication with 8. In step (12.5), the opcode is determined. The desired opcode is then located in register A.

Using algorithm 12, the full secure transposition of two registers to protect against side channel attacks is as follows:

(13.1) Calculate A & 0xfd (mask out the second least significant bit)
(13.2) Set A=A+1
(13.3) Calculate A & 0x03 (mask out all bits except for the two least significant)
(13.4) Rotate A three bits to the left
(13.5) Calculate A | 10x63
(13.6) Shift the ACE register CR1 toward C
(13.7) Shift the ACE-Register CR2 toward CR1
(13.8) Write the opcode A into the instruction register of the coprocessor ACE In algorithm 13, the calculation steps for determining an opcode for the crypto-coprocessor from algorithm 12 are combined with the steps from algorithm 8 for the transposition of the contents of the register CR1 and CR2 of the coprocessor in dependence on a defined key bit.

The present invention is not restricted to the examples of embodiments described here.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v *DIRECTV*, 358 F3d 870, 69 USPQ2d 1865 (Fed. Cir. 2004).

The invention claimed is:

1. A method for the secure determination of data comprising:
applying in a first processor a mathematical operation with a key to a point of an elliptical curve, wherein the key may be depicted as a binary number with a sequence of bits ($b_i$) with a first instruction (x) which, when communication to a second processor, leads to a first operation (X) on the contents of at least one register and a second instruction (y), when communicated to the second processor, leads to a second operation (Y), comprising:
determining of at least one value (d) in dependence on the two instructions (x, y);
initializing of a first auxiliary variable (R) and a second auxiliary variable (S);
sequentially performing of the following steps s1-s4 for every bit ($b_i$) of the key:
s1. communicating of the first auxiliary variable (R) to a first register and the second auxiliary variable (S) to a second register of the second processor,
s2. assigning, in dependence on the value of the bit ($b_i$) and on the at least one value (d), of a instruction to an output variable (A) in such a way that either the first instruction (x) is assigned, or the second instruction (y) is assigned,
s3. transmitting of the output variable (A) to the instruction register of the second processor,
s4. determining of the first (R) and second (S) auxiliary variables updated in the second processor; and
outputting, after the termination of the steps for the bit ($b_i$), of the first (R) and/or the second (S) auxiliary variable and determining a result of the mathematical operation from the first (R) and/or the second auxiliary variable (S)

wherein the first operation (X) on register contents of the second processor, which is assigned to the first instruction (x), results in a transposition of the contents of the first and the second register, and in which the second operation (Y) on register contents of the second processor, which is assigned to the second instruction (y), does not result in a transposition of the contents of the first and the second register wherein the first processor communicates the instructions (x) and (y) to the second processor and the second processor performs the operations (X) and (Y) responsive to the instructions.

2. The method as claimed in claim 1, wherein the first auxiliary variable (R) represents a point on an elliptical curve over a finite field and in the initialization step is assigned a fixed point (P).

3. The method as claimed in claim 1, wherein the second auxiliary variable (S) represents a point on an elliptical curve over a finite field and in the initialization step is assigned a value O.

4. The method as claimed in claim 1, wherein the mathematical operation comprises a scalar multiplication (k*P).

5. The method as claimed in claim 1, wherein the updating of the first (R) and second (S) auxiliary variables performed in the second processor comprises:
 performing, in a first arithmetic operation, addition of two points on an elliptical curve,
 performing, in a second arithmetic operation, a scalar multiplication of a point on an elliptical curve with a factor 2 or its addition to itself, and
 performing the determination of the updated first and second auxiliary variables in such a way that, in dependence on the value of the bit ($b_i$), in each case a result of the first and second arithmetic operation is assigned to one of the two auxiliary variables (R, S).

6. The method as claimed in claim 1, wherein the value (d) is a differential value from the difference between the bit representation of the two instructions (x, y).

7. The method as claimed in claim 6, wherein in s2 the differential value (d) is added to the first instruction (x) in dependence on the value of the current bit (bi), wherein
 a first computer word (h1) is formed which contains the current bit ($b_i$) in the sequential processing,
 the first computer word (h1) is multiplied with the differential value (d) to produce a first product (m1),
 a first intermediate value is determined from an addition of the first product (m1) to the first instruction (x),
 from the first computer word (h1), a second computer word (h2) is formed in which the bit at the position of the current bit ($b_i$) is set to zero,
 the second computer word (h2) is multiplied with the differential value (d) to form a second product (m2), and
 the output variable (A) is determined from a subtraction of the second product (m2) from the first intermediate result in such a way that either the first instruction (x) or the second instruction (y) is assigned to the output variable (A).

8. The method as claimed in claim 6, wherein in s2, in dependence on the value of the bit ($b_i$), the differential value (d) is subtracted from the second instruction (y) in such a way that either the first instruction (x) is assigned, or the second instruction (y) is assigned to the output variable (A).

9. method as claimed in claim 1, wherein the current bit ($b_i$) in the sequential processing is the least significant bit (LSB).

10. The method as claimed in claim 1, wherein the first instruction (x) leads to a communication of the contents of a third register of the second processor to the first register of the second processor and the second instruction (y) leads to a communication of the contents of the third register to the second register of the second processor, after s1 an instruction to transmit the contents of the first register to the third register and an instruction to transmit the contents of the second register to the first register is transmitted to the instruction register of the second processor.

11. The method as claimed in claim 1, wherein the first (x) and the second (y) instruction have the same Hamming weight.

* * * * *

UNITED STATES PATENT AND TRADEMARK OFFICE
CERTIFICATE OF CORRECTION

PATENT NO. : 8,369,514 B2  
APPLICATION NO. : 12/294806  
DATED : February 5, 2013  
INVENTOR(S) : Michael Braun et al.

Page 1 of 1

It is certified that error appears in the above-identified patent and that said Letters Patent is hereby corrected as shown below:

Title Page, item [73] (Assignee); Line 1, Delete "Seimens" and insert -- Siemens --, therefor.

In the Claims:
Column 8, Line 44, In Claim 1, delete "(y)," and insert -- (y), which --, therefor.
Column 10, Line 3, In Claim 7, delete "(bi)," and insert -- ($b_i$), --, therefor.
Column 10, Line 10, In Claim 7, delete "(h1),a" and insert -- (h1), a --, therefor.
Column 10, Line 24, In Claim 9, delete "method" and insert -- The method --, therefor.

Signed and Sealed this  
Thirtieth Day of April, 2013

Teresa Stanek Rea  
*Acting Director of the United States Patent and Trademark Office*